United States Patent [19]

Wintrell et al.

[11] Patent Number: 4,497,304
[45] Date of Patent: Feb. 5, 1985

[54] FUEL AND AIR MIXING APPARATUS

[75] Inventors: Reginald Wintrell; Vaughn R. Anderson, both of Orem, Utah

[73] Assignee: Dual Fuels Associates Corporation, Orem, Utah

[21] Appl. No.: 139,572

[22] Filed: Apr. 11, 1980

[51] Int. Cl.³ ............................................. F02M 21/02
[52] U.S. Cl. .................................. 123/527; 123/1 A; 48/180 C; 261/16
[58] Field of Search ........................ 123/1 A, 575–578, 123/525; 48/180 C, 184; 261/16; 55/DIG. 28

[56] References Cited

U.S. PATENT DOCUMENTS 3,650,254  3/1972  McJones ........................... 123/527

*Primary Examiner*—E. Rollins Cross
*Attorney, Agent, or Firm*—Trask and Britt

[57] ABSTRACT

The invention comprises a system for introducing gaseous or vaporized fuels into a carburetor from a storage tank including a regulator connected between the tank and the carburetor for providing a supply of hydrocarbon fuel in a gaseous state at a regulated vapor pressure to a mixing chamber having air and fuel intake ports to blend said hydrocarbon fuel with intake air for injection into the carburetor. In a typical installation, the pressure change of the vacuum manifold alters the pressure within the mixing chamber to draw in fuel and air in proportion to a near constant equivalence ratio, due to the respective areas of the intake ports, over the entire operating range of the engine.

32 Claims, 3 Drawing Figures

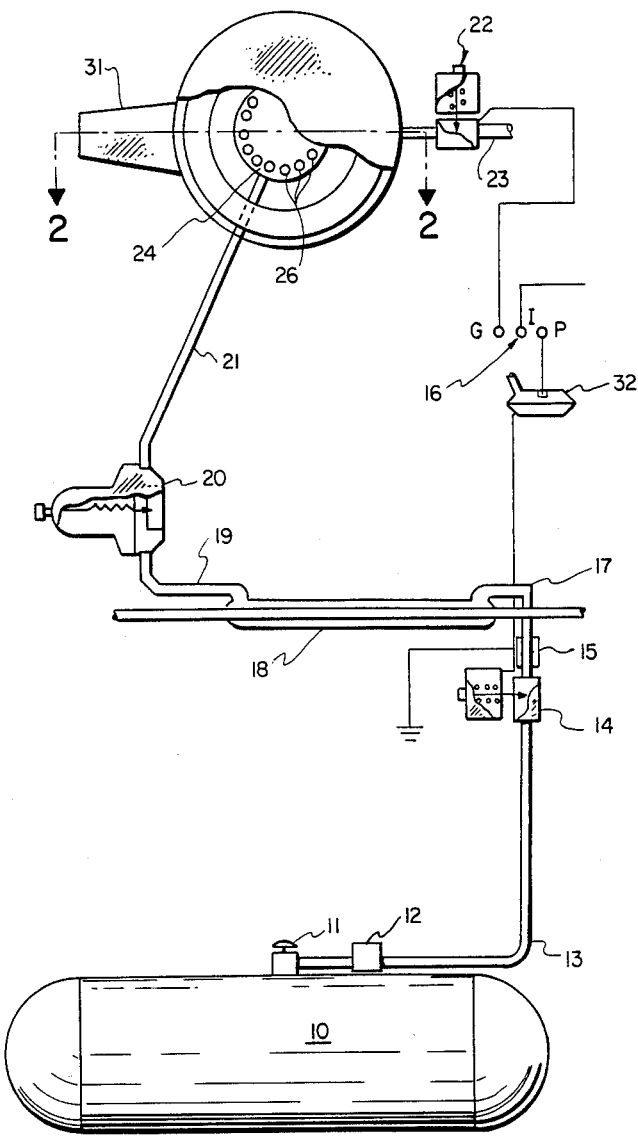
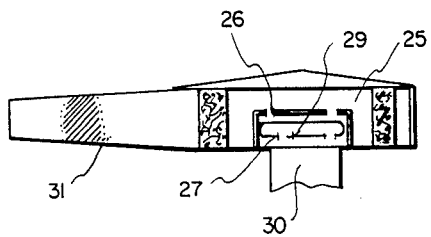
Fig. 1
Fig. 2

FUEL AND AIR MIXING APPARATUS

BACKGROUND OF THE INVENTION

1. Field

This invention pertains to alternate fuels for internal combustion engines, notably automotive engines. It provides a system for introducing air and low molecular weight hydrocarbon fuel mixtures, notably propane mixtures, in a gaseous (or vaporous) state into the carburetor or intake manifold of an internal combustion engine.

2. State of the Art

It is known that many fuels can be used in the internal combustion engine. For example, vaporized liquid fuels, such as gasoline, ethanol and "gasohols"; producer gas; and normally gaseous (at ambient conditions) hydrocarbons, such as natural gas, hydrogen and propane can be used. Fuels which are normally in vapor state at ambient temperatures are generally pressurized and stored as liquids. A fuel of particular interest is liquid petroleum gas (LPG), a by-product of oil refineries and natural gas plants. LPG is easily liquified under moderate pressure and transforms to the gaseous state readily at normal atmospheric pressures and the temperatures normally present in the proximity of internal combustion engines. LPG is a mixture of low molecular weight hydrocarbon gases predominating in propane and including a significant proportion of butane.

The present disclosure emphasizes the use of propane or LPG fuels because of their practical availability, the experience in the art with the use of such fuels, and their desirable physical properties from the standpoint of handling. Nevertheless, it should be understood that the invention disclosed herein is readily modifiable for use with any of the other fuels which may be used in internal combustion engines.

Several "dual-fuel" systems have been proposed whereby the operator of a motor vehicle may selectively inject gasoline or propane into an internal combustion engine in admixture with the proper amount of air. One example of such a system is that provided by Impco, a division of A. J. Industries, Inc. of Cerritos, Calif., described in the December 1969 issue of Road Test Magazine at pages 62 through 65. In addition, LPG systems have been offered by the International Harvester Company on certain of that company's trucks. The Century LPG system, offered between the years 1965 and 1971, and the Ensign LPG systems, offered between the years 1965 and 1968, are described by "Mitchell Manuals Light Truck Tune-Up" (MM2-118) published by Mitchell Manuals, Inc.

The systems of the prior art, while operable, are generally complex and expensive. They must either be installed by the original manufacturer or by an expert with special knowledge and equipment. Characteristically, a separate carburetor is required to handle the LPG or propane fuel. In other instances, the existing carburetor is modified for the use of LPG fuels and must be again modified to convert back to the use of gasoline. Accordingly, there remains a need in the art for a simple system which can be installed in a motor vehicle by an individual of modest mechanical aptitude using readily available components at moderate cost.

RELATED APPLICATIONS

Related to this patent application is applicants' copending patent application entitled "Variable Orifice Fuel Carburetor," Ser. No. 139,434, filed concurrently with this application, the disclosure of which is incorporated herein by reference. This application is also related to Ser. No. 099,730, filed Dec. 3, 1979, entitled "Dual Fuel Engine System" of Wintrell, one of the inventors of this application. The disclosure of the earlier filed application is also incorporated herein by reference.

SUMMARY OF THE INVENTION

Generally, applicants' invention is an apparatus for blending a combustion mixture of low molecular weight hydrocarbon fuel and air, and introducing this mixture into the manifold, (often through a carburetor), of an internal combustion engine. The apparatus of this invention comprises a mixing chamber mounted in association with the intake manifold of an engine to sense changes in pressure within the manifold. It includes: air supply means, including air orifice means, in communication with the interior of the chamber to deliver air into the chamber at a rate determined in response to the pressure within the chamber; and fuel supply means, including fuel orifice means, in communication with the interior of the chamber to deliver fuel into the chamber at a rate similarly determined in response to the pressure within the chamber. The flow-through capacities of the air orifice means and the fuel orifice means are selected to provide the volume requirements of the manifold. These flow-through capacities are proportioned relatively to effect a predetermined equivalence ratio of air to fuel. The flow characteristics of the air supply means and the fuel supply means are selected to effect rapid blending within said chamber, thereby to produce a combustion mixture. Port means are provided for transferring the combustion mixture to the manifold at a rate determined by the pressure within said manifold. The entire apparatus may be installed on the intake side of a conventional carburetor mounted to feed into the intake manifold of the engine. In that case, the carburetor serves as an extension of the port means.

Applicants' invention may also be adapted to deliver a combustion mixture into the carburetor of an internal combustion engine. The invention may also be incorporated into a low molecular weight hydrocarbon alternative fuel circuit, wherein the carburetor combustion mixture may be selected at will from either a gasoline mixture or a hydrocarbon fuel mixture as disclosed in the aforementioned copending patent application Ser. No. 099,730.

In operation, the apparatus is first adjusted to provide the air and fuel volume requirements entering the apparatus for blending and delivering a desired hydrocarbon fuel/air combustion mixture. The actual flows of air and hydrocarbon fuel into the mixing chamber are adjusted using conventional means well known in the art to compensate for the fuel system's fluid characteristics. The effects of air and fuel temperature and pressure, the configuration of the fuel lines, intake ports, mixing chambers, bends in ducts, and nozzles, the fuel and air drag, laminar flow, viscosity, turbulent flow, unsteady flow, and other flow characteristics of the fuel system must be compensated for to deliver the desired combustion mixture into the mixing chamber. Because the combustion characteristics of different hydrocarbon fuels vary, the system will ordinarily be especially adjusted for each fuel selected.

The air supply means generally comprises a source of air, such as the ambient air in the proximity of the mixing chamber. This source of air is conveyed to the mixing chamber using conventional air orifice means such as a series of ports, defined by the mixing chamber walls, in communication with the ambient air and the interior of said mixing chamber.

The fuel supply means generally comprises a source of fuel stored in gaseous or liquid form. This fuel is transported from its source to the mixing chamber after first being gasified, if necessary. Again, conventional fuel orifice means are utilized, such as tubes in communication with the fuel source and having discharge openings in communication with the interior of the mixing chamber.

The desired ratio (combustion mixture) of fuel air flow into the mixing chamber is obtained by selecting appropriate cross-sectional areas for the air orifice and fuel orifice means. This ratio is approximately maintained over the full operating range of the engine because the orifice cross-sections are held constant. With the air and fuel means adjusted to deliver the necessary air and fuel flows into the mixing chamber to form a desired combustion mixture, the ratio of the cross-sectional areas of the openings of the air orifice means at the point of entry into the mixing chamber with respect to the cross-sectional areas of the openings of the fuel orifice means at the point of entry into the mixing chamber is termed the "equivalence ratio" (or more precisely, the "area equivalence ratio").

The desired combustion mixture is then inherently drawn into the mixing chamber by the vacuum created by the intake manifold. This results because the "area equivalence ratio" is constant, and the intake manifold creates a vacuum pressure which is the same across the fuel and air orifice means leading into the mixing chamber. Consequently, the manifold pressure has approximately the same effect on the fuel flow as on the air flow into the manifold so that an approximately constant air and fuel mixture is maintained throughout the operating range of the engine. A relatively uniform and consistent combustion mixture is thus maintained.

Applicants' invention, when mounted to a carburetor in communication with the engine manifold, responds in a similar manner to pressure changes in the manifold. The desired combustion mixture is blended in the mixing chamber and delivered to the carburetor before being drawn into the engine manifold.

The design of the fuel orifice means and the air orifice means is selected to deliver fuel and air into the mixing chamber in a turbulent flow to facilitate rapid blending of the constituents of the combustion mixture before transferring the combustion mixture into the manifold or carburetor. Although various fuel and air orifice means are within contemplation, the preferred embodiment comprises a plurality of fuel and air intake orifices or ports, structured and spaced to inject turbulent streams of air and fuel into the mixing chamber in direct response to the pressure changes within the mixing chamber.

When installed within a conventional air filter, the mixing chamber has a plurality of air intake ports leading into its interior from the interior of the air filter. The mixing chamber also has a plurality of fuel intake ports leading directly into its interior from a fuel source. In applicants' preferred embodiment, these air and fuel intake ports are circular and spaced apart. They are sized to provide an orifice which creates a turbulent stream at the flow-through volumes entering the chamber. This turbulence effects rapid blending of the combustion mixture. However, the actual shape of the ports is not material provided the "area equivalence ratio" remains constant and sufficient turbulence results upon delivery of the air and fuel into the mixing chamber for rapid blending.

When mounted within a conventional air filter mounted above the carburetor, the mixing chamber is adaptable for use with dual fuel systems in which either gasoline or low molecular weight hydrocarbon fuels may selectively be delivered to the same carburetor. The carburetor is first adjusted for the delivery of a gasoline mixture into the carburetor. The "area equivalence ratio" of the hydrocarbon fuel and air entering the mixing chamber is then adjusted to deliver a desired fuel/air combustion mixture into the carburetor. Either fuel mixture may then be selected for injection into the carburetor by use of a valve mechanism, such as the electric solenoid switching devices disclosed in the aforementioned application, Ser. No. 099,730.

If conventional fuel line pressure regulators and temperature regulators are used in combination with applicants' invention, "area equivalence ratios" at pressures and temperatures other than at ambient may be used. However, it is preferred that the fuel line pressure entering the mixing chamber have a slight positive pressure. It is also preferred that the fuel temperature be approximately the same as the ambient intake air entering the mixing chamber. Use of fuel line temperature and pressure regulators enable the "area equivalence ratios" to be more precisely controlled over varying ambient temperatures and pressures. The term "ambient" as used in this disclosure refers to the temperatures and pressures actually existing in the proximity of the engine.

Applicants' invention is especially designed for use with propane. However, the device may be used with any low molecular weight fuel, such as butane, methane, natural gas, hydrogen, carbon monoxide, producer gas and the like. Of course, an appropriate "area equivalence ratio" should be determined for the fuel selected. When operating on propane, the equivalence ratio for conventional carburetor internal combustion engines is selected from within the range of about 11 to about 19.0 Other equivalence ratios for similar fuel systems are approximated by theory and adjusted through empirical test procedures to accommodate the air and fuel flow characteristics previously mentioned.

DESCRIPTION OF THE DRAWINGS

In the drawings, which illustrate that which is presently regarded as the best mode for carrying out the invention, FIG. 1 is a partially schematic illustration of the components of a complete system of this invention;

FIG. 2 is a cross-sectional view of the mixing chamber of this invention in association with a portion of an air cleaner.

DESCRIPTION OF THE ILLUSTRATED EMBODIMENT

Figure 3:
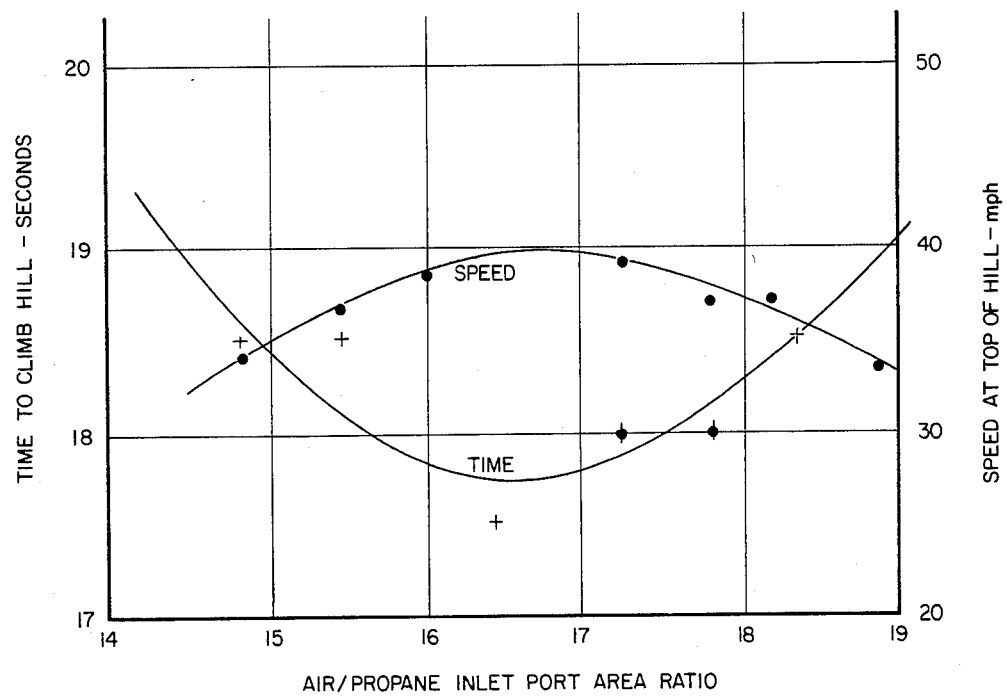
FIG. 3 is a plot of data taken in a hill climb test.

As best illustrated by FIG. 1, a pressure tank 10 contains a supply of pressurized liquid propane or LPG. This fuel is delivered through a hand shut-off valve 11, a filter 12 and a liquid fuel line 13 through a lock-off solenoid 14 to an automatic expansion valve 15 which reduces the line pressure from the storage pressure of the tank (typically in the range of about 100 to about 150 psi) to a reasonable operating pressure (typically in the range of about 30 to about 50 psi). The lock-off solenoid valve 14 is controlled by a selector switch 16. Operation of the selector switch 16 will be explained in further detail subsequently in this disclosure.

With the solenoid valve 14 open, liquid propane is permitted to flow through the line 17 through a heat exchange device 18 wherein it is vaporized. A heat exchanger 18 may be connected to circulate hot vapors from the manifold or water from the hot water system in conventional fashion. Fuel in gaseous state passes through the line 19 into a regulator 20. The regulator 20 reduces the pressure from line 19 (typically within the range from about 30 to about 50 psi) to the desired operating range (preferably at or near the intake air atmospheric pressure).

All of the components thus far described are more or less conventional, and can be acquired as stock items from industrial parts dealers. The system may also include a vacuum safety switch 32 responsive to the manifold vacuum. Any loss of manifold vacuum (e.g., resulting from stalling of the engine) automatically interrupts current flow to the lock-off solenoid 14, thereby mechanically isolating the tank 10 from the remainder of the system. These components are also readily available stock items. When the invention is installed in a "dual-fuel" system, for example, a system adapted selectively to supply either normal gasoline or LPG to an internal combustion engine, a second lock-off solenoid 22 may be installed as shown in the gasoline fuel line 23.

Fuel at or near atmospheric pressure passes through line 21 to a mixing chamber 24. The mixing chamber 24, when mounted within a conventional air filter 31, forms an outer chamber 25 surrounding the mixing chamber 24. The mixing chamber 24 defines an inner chamber 27 (as shown in FIG. 2). The inner chamber 27 has a plurality of air intake ports 26 leading into the inner chamber 27 from the outer chamber 25 and a plurality of fuel intake ports 29 leading into the inner chamber 27 from a fuel source. The inner chamber 27 is in communication with a carburetor 30 such that a combustion mixture is delivered into the carburetor from the inner chamber 27 in response to changes in pressure created by the intake manifold (not shown).

Use of applicants' invention in combination with an air filter 31 provides excellent turbulent air flow into the mixing chamber 24. Another advantage of mounting the invention within the air filter 31 is that fewer parts are needed to adapt applicants' invention to a dual fuel system. However, the invention may be mounted directly to a carburetor 30 without an air filter 31.

In one adaptation of applicants' invention for use with propane, the air intake ports 26 are circular, and have diameters selected from the range of about ⅛ to about ⅜ inch. Typically, about 20 to about 200 air intake ports 26 lead into a cylindrically shaped inner chamber 27 having a volume capacity of approximately 60 cubic inches. The fuel intake ports 29 are also circular, and have diameters selected from the range of about 1/16 to about ⅛ inch. Typically, about 10 to about 60 fuel intake ports 29 lead into the inner chamber 27. The useful range for the ratio of the summed cross-sectional areas of the air intake ports 26 to the fuel intake ports 29 has been determined experimentally, as described in Example I, to be about 11 to about 19.

Referring to switch 16, a terminal "I" of the ignition switch may selectively be conductively connected to either a gasoline terminal "G" or a propane terminal "P." When the terminals "I" and "G" are connected, the solenoid 22 opens and the solenoid 14 closes so that gasoline and not propane is introduced to the carburetor. Alternatively, when the terminals "I" and "P" are connected so that there is an open circuit between the terminals "I" and "G", the solenoid 14 opens on closing of the vacuum switch to pass propane, ad the solenoid 22 locks off to mechanically isolate the gasoline fuel supply from the carburetor.

In operation of a vehicle, the accelerator foot pedal is depressed, thereby increasing the suction pressure created beneath the mixing chamber 24 by the engine manifold. This suction pressure increase causes the pressure within the mixing chamber 24 to decrease. Since the fuel line pressure and the air intake pressure are approximately the same at the point of entry into the mixing chamber 24, identical differential pressures over the air and fuel intake ports 26, 29 result. Thus, air and fuel are injected into the mixing chamber 24 approximately proportional to the effective cross-sectional areas of the intake ports 26, 29.

These cross-sectional areas of the intake ports 26, 29 are apportioned in the design of the mixing chamber 24 to insure that the ports 26, 29 are of appropriate size to allow sufficient fuel to enter the mixing chamber 24 to enable the engine to operate over its full range of operation. The method to determine the area equivalence ratios of the intake ports 26, 29 to provide desired flow into the mixing chamber is illustrated in the following examples for a propane fuel system and for a hydrogen fuel system:

EXAMPLE I

To calculate the ratio of the cross-sectional areas of the propane ports 29 with respect to the air ports 26 leading into the mixing chamber 24, Let;

| | | |
|---|---|---|
| Ta | = Air temperature at inlet to the mixer | °F. |
| Tp | = Propane temperature at inlet to the mixer | °F. |
| Pa | = Air pressure at inlet to the mixer | lbs/sq. ft. |
| Pp | = Propane pressure at inlet to the mixer | lbs/sq. ft. |
| Aa | = Area of inlet for air flow through mixer | sq. ft. |
| Ap | = Area of inlet for propane flow through mixer | sq. ft. |
| Sp | = Suction or pressure due to throttling at any time t | lbs/sq. ft. |
| Ea | = The density of air at entry to the mixer | lbs/sq. ft. |
| Ep | = The density of propane at entry to the mixer | lbs/sq. ft. |
| Va | = Velocity of air through air ports to the mixer | ft./sec. |
| Vp | = Velocity of propane through propane ports to the mixer | ft./sec. |
| Fa | = Actual flow through air ports | cu. ft./sec. |
| Fp | = Actual flow through propane ports | cu. ft./sec. |

For the stoichiometric combustion of propane with air at standard temperature and pressure conditions, $$C_3H_8 + \left(5O_2 + 5 \times \frac{79}{21} N_2\right) =$$

$$3CO_2 + 4H_2O + 5 \times \frac{79}{21} N_2$$

One volume of propane requires 23.8 volumes of air for stoichiometric combustion. At any time "t" the differential pressure across the air ports 26

$$da = Pa - Sp$$

and the differentail pressure across the propane ports 29

$$dp = Pp - Sp$$

Regulation of Pp to equal Pa requires that da=dp. The actual flow of propane through the propane ports 29 is expressed as:

$$Fp = Ap \times Vp$$

The actual flow of air through the air ports 26 is expressed as:

$$Fa = Aa \times Va$$

From theoretical calculations, the differential pressure across the propane port 29 is expressed as:

$$dp = \frac{Ep \, Vp^2}{2g}$$

Therefore: $Vp = \sqrt{\frac{dp \times 2g}{Ep}}$ ft./sec.

and $Va = \sqrt{\frac{dp \times 2g}{Ea}}$ ft./sec.

Thus for air, $$Fa = Aa \sqrt{\frac{dp \times 2g}{Ea}}$$

at 60° F. Converting to standard temperature and pressure, $$Fa = Aa \sqrt{\frac{dp \times 2g}{Ea}} \times \frac{520}{Ta + 460} \quad \text{s.c.f.s (standard cu.ft/sec.)}$$

For propane, $$Fp = Ap \sqrt{\frac{dp \times 2g}{Ep}}$$

at 60° F. Again converting to standard temperature and pressure, $$Fp = Ap \sqrt{\frac{dp \times 2g}{Ep}} \times \frac{520}{Ta + 460}$$

Therefore, the ratio of the flows under standard conditions equals:

$$\frac{Fa}{Fp} = \frac{Aa}{Ap} \sqrt{\frac{Ep}{Ea}} \times \left[\frac{Tp + 460}{Ta + 460}\right]$$

Assuming stoichiometric cumbustion conditions derived above, $$\frac{Fa}{Fp} = 23.8 = \frac{Aa}{Ap} \sqrt{\frac{Ep}{Ea}} \times \left[\frac{Tp + 460}{Ta + 460}\right]$$

Thus $\frac{Aa}{Ap} = 23.8 \sqrt{\frac{Ea}{Ep}} \times \left[\frac{Ta + 460}{Tp + 460}\right]$ Substituting the densities of air and propane derived from conventional tables, $$\frac{Ea}{Ep} = \frac{28.8}{44} \times \frac{(460 + Tp)}{(460 + Ta)}$$

Therefore $\frac{Aa}{Ap} = 23.8 \sqrt{\frac{28.8}{44} \times \frac{Ta + 460}{Tp + 460}}$ Assuming a cold day, Ta=32° F. and Tp=120° F.

$$\frac{Aa}{Ap} = 23.8 \sqrt{\frac{28.8}{44} \times \frac{492}{580}}$$

$$= 17.73 \text{ air/propane area ratio.}$$

Assuming a hot day, Ta=100° F. and Tp=140° F.

$$\frac{Aa}{Ap} = 23.8 \sqrt{\frac{28.8}{44} \times \frac{560}{600}}$$

$$= 18.6 \text{ air/propane area ratio.}$$

By using a propane/air heat exchanger to maintain the temperature of propane the same as the temperature of the air, the ratio Aa/Ap is dependent only upon the stoichiometric combustion conditions and the respective densities. Therefore, $$Aa/Ap = 23.8 \sqrt{28.8/44} = 19.25$$

to 1 for all conditions.

Experimentally, it was found that a theoretical Aa/Ap ratio of about 18.2 to 1 was within 2% of the stoichiometric combustion conditions predicted. These theoretical results must be adjusted for practical considerations such as pressure loss variations in the propane and air inlet ports, variations in the regulator pressure from atmospheric air and air leakage. The practical air/propane port area ratio of the air intake ports 26 to the propane intake ports 29 is therefore lower.

A hill climb test using a motor vehicle where the port area ratios were varied gave the graph results illustrated in FIG. 3. The times to climb the hill and the maximum speeds obtained were plotted against variations in the port area ratios. These port area ratios were derived experimentally by first opening all air intake ports 26 into the mixing chamber 24. The air intake ports 26 were then selectively shut off until an optimum operative mixture was obtained. The mixing chamber 24 was cylindrical in shape, having a diameter of approximately $5\frac{1}{8}$ inches, a height of approximately 3 inches and a volume of approximately 62 cubic inches. Twenty-six circular propane intake ports 29 of approximately 5/64 inch diameter were structured in communication with the inner chamber 27 of the mixing chamber 24. Forty-three circular air intake ports 26 of approximately $\frac{1}{4}$ inch diameter were also structured in communication with the inner chamber 27 of the mixing chamber 24. The optimum operative mixture was thus determined by testing, such that the total cross-sectional area of the air intake ports 26 was approximately 2.11 square inches, and the total cross-sectional areas of the fuel intake ports 29 was approximately 0.124 square inches. Although in actual testing the area equivalence ratio varied from vehicle to vehicle over a range from 11 to 18, for the majority of vehicles and for optimal power the range was narrowed down to between 15 and 17.

EXAMPLE II

Applying the proceduers of Example I to determine the equivalence ratio for the system to operate on hydrogen and air, the stoichiometric air/hydrogen combustion ratio is Hydrogen+Air $$2H_2 + \left[ O_2 + \frac{79}{21} N_2 \right] = 2H_2O + \frac{79}{21} N_2$$

For stoichiometric combustion, therefore one volume of hydrogen requires 2.38 volumes of air. From conventional tables, substituting the densities of hydrogen and air, $$\frac{Ea}{Eh} = \frac{28.2}{2} = 14.4$$

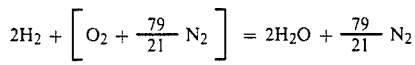

If the temperature of the hydrogen is regulated to be the same as that of air, the port area ratio becomes $$\frac{Aa}{Ah} = 2.38 \sqrt{14.4} = 9.03$$

For practical application, the port area ratio for hydrogen fuel would be determined using the same experimental techniques outlined above and would be anticipated to be within the range of about 8 to about 9.

Other conventional methods using equations, components and techniques well known in the art may be used to determine the preferred equivalence ratios.

Although this disclosure has made particular reference to the illustrated embodiment, it is not intended thereby to restrict the scope of the appended claims, which themselves recite those details regarded as essential to the invention.

We claim:

1. Apparatus for blending a combustion mixture of fuel and air, and introducing said mixture into the manifold of an internal combustion engine in response to operation of an accelerator, comprising:
    a mixing chamber mounted in association with said manifold to sense changes in pressure beneath said chamber in response to operation of said accelerator, and including:
        air supply means, including air orifice means in communication with the interior of said chamber to deliver air into said chamber at a rate determined by the pressure within said chamber,
        fuel supply means, including fuel orifice means in communication with the interior of said chamber to deliver fuel into said chamber at a rate determined by the pressure within said chamber,
        the flow-through capacities of said air orifice means and said fuel orifice means being selected to provide the volume requirements of said manifold and proportioned relatively to effect a predetermined approximately constant area equivalence ratio, and
        the flow characteristics of said air supply means and said fuel supply means being selected to effect rapid blending within said chamber, thereby to produce a combustion mixture, and
    port means for transferring said combustion mixture to said manifold.

2. An apparatus according to claim 1, wherein the mixing chamber is mounted in communication with said manifold and has a plurality of air intake ports leading into the interior of said chamber from an ambient air source, and a plurality of fuel intake ports leading into the interior of said chamber from a fuel source; the cross-sectional areas of the fuel and air intake ports, respectively, selected to effect a predetermined area equivalence ratio; said intake ports structured to deliver air and fuel into said chamber under turbulent conditions.

3. Apparatus for blending a combustion mixture of fuel and air, and introducing said mixture into the carburetor of an internal combustion engine, comprising:
    a mixing chamber mounted in association with said carburetor to sense changes in pressure within said carburetor, and including:
        air supply mean, including air orifice means of fixed cross-sectional area in communication with the interior of said chamber to deliver air into said chamber at a rate determined by the pressure within said chamber,
        fuel supply means, including fuel orifice means of fixed cross-sectional area in communication with the interior of said chamber to deliver fuel into said chamber at a rate determined by the pressure within said chamber,
        the flow-through capacities of said air orifice means and said fuel orifice means being selected to provide the volume requirements of said carburetor and proportioned relatively to effect a predetermined area equivalence ratio, and
        the flow characteristics of said air supply means and said fuel supply means being selected to effect rapid blending within said chamber, thereby to produce a combustion mixture, and
    port means for transferring said combustion mixture to said carburetor at a rate determined by the pressure within said carburetor.

4. An apparatus according to claim 3, wherein the mixing chamber is mounted in communication with said carburetor and has a plurality of air intake ports leading into the interior of said chamber from an ambient air source, and a plurality of fuel intake ports leading into the interior of said chamber from a fuel source; the cross-sectional areas of the fuel and air intake ports, respectively, selected to effect a predetermined area equivalence ratio.

5. An apparatus according to claim 4 mounted within a conventional air filter of an internal combustion engine, which filter defines an outer chamber in communication with an air source.

6. A fuel system for introducing a low molecular weight fuel air mixture into a manifold, comprising:
   tank means for storing said low molecular weight fuel under pressure;
   regulator means connected between said tank means and said manifold for providing a supply of said fuel in a gaseous state at a regulated pressure;
   a mixing chamber mounted in association with said manifold to sense changes in pressure within said manifold, and including:
      air supply means, including air orifice means of fixed cross-sectional area in communication with the interior of said chamber to deliver air into said chamber at a rate determined by the pressure within said chamber,
      fuel supply means, including fuel orifice means of fixed cross-sectional area in communication with the interior of said chamber to deliver fuel into said chamber at a rate determined by the pressure within said chamber;
      the flow-through capacities of said air orifice means and said fuel orifice means being selected to provide the volume requirements of said manifold and proportioned relatively to effect a predetermined area equivalence ratio, and
      the flow characteristics of said air supply means and said fuel supply means being selected to effect rapid blending within said chamber, thereby to produce a combustion mixture; and
   port means for transferring said combustion mixture to said manifold at a rate determined by the pressure beneath the mixing chamber.

7. A fuel system according to claim 6, wherein said fuel is stored as a liquid and is passed through pressure reduction means and heat exchange means, thereby to vaporize it prior to introduction to said regulator.

8. A fuel system according to claim 7, wherein said fuel is propane and the area equivalence ratio is selected at about 19.

9. A fuel system according to claim 8, wherein the regulator means maintain the pressure of the hydrocarbon fuel entering the mixing chamber at a positive pressure near the pressure of the ambient air.

10. A fuel system according to claim 9, wherein fuel line temperature regulator means maintain the temperature of the fuel entering the mixing chamber at approximately the same temperature as the ambient air entering the mixing chamber.

11. A fuel system for introducing a low molecular weight fuel air mixture into a carburetor, comprising:
   tank means for storing said fuel under pressure;
   regulator means connected between said tank means and said carburetor for providing a supply of said fuel in a gaseous state at a regulated pressure;
   a mixing chamber mounted in association with said carburetor to sense changes in pressure within said carburetor, and including:
      air supply means, including air orifice means of fixed cross-sectional area in communication with the interior of said chamber to deliver air into said chamber at a rate determined by the pressure within said chamber;
      fuel supply means, including fuel orifice means of fixed cross-sectional area in communication with the interior of said chamber to deliver fuel into said chamber at a rate determined by the pressure within said chamber;
      the flow-through capacities of said air orifice means and said fuel orifice means being selected to provide the volume requirements of said carburetor and proportioned relatively to effect a predetermined area equivalence ratio, and
      the flow characteristics of said air supply means and said fuel supply means being selected to effect rapid blending within said chamber, thereby to produce a combustion mixture; and
   port means for transferring said combustion mixture to said manifold at a rate determined by the pressure within said carburetor.

12. A fuel system according to claim 11 mounted within a conventional air filter of an internal combustion engine, which filter defines an outer chamber in communication with an air source.

13. A fuel system according to claim 11, wherein said fuel is propane and the equivalence ratio is at about 19.

14. A fuel system according to claim 11, wherein said fuel is hydrogen gas and the equivalence ratio is selected from within the range of about 8 to about 9.

15. A fuel system according to claim 11, wherein the means for varying the pressure within the carburetor comprises an engine manifold creating a vacuum in registration with the carburetor and mixing chamber.

16. A fuel system according to claim 11, wherein the regulator means maintain the pressure of the fuel entering the mixing chamber at a positive pressure near the pressure of the ambient air.

17. A fuel system according to claim 11, wherein fuel line temperature regulator means maintain the temperature of the fuel entering the mixing chamber at approximately the same temperature as that of the intake air entering the mixing chamber.

18. A dual fuel system for alternatively introducing low molecular weight fuel into the carburetor of a conventional gasoline engine fuel system, comprising:
   tank means for storing said fuel under pressure;
   regulator means connected between said tank means for providing a supply of said fuel in a gaseous state at a regulated pressure;
   a mixing chamber mounted in association with said carburetor to sense changes in pressure within said carburetor, and including:
      air supply means, including air orifice means in communication with the interior of said chamber to deliver air into said chamber at a rate determined by the pressure within said chamber;
      fuel supply means, including fuel orifice means in communication with the interior of said chamber to deliver fuel into said chamber at a rate determined by the pressure within said chamber;
      the flow-through capacities of said air orifice means and said fuel orifice means being selected to provide the volume requirements of said carburetor and proportioned relatively to effect a predetermined area equivalence ratio, and
      the flow characteristics of said air supply means and said fuel supply means being selected to effect rapid blending within said chamber, thereby to produce a combustion mixture;
   port means for transferring said combustion mixture to said carburetor at a rate determined by the pressure within said carburetor; and a switch for selectively connecting a fuel terminal to open the circuit of said low molecular weight fuel to the mixing chamber while shutting off a supply of gasoline to the carburetor; or a gasoline terminal to close the circuit of said low molecular weight fuel to the mixing chamber while opening the supply of gasoline to the carburetor.

19. A dual fuel system according to claim 18, wherein said fuel is a hydrocarbon fuel stored as a liquid and is passed through heat exchange means, thereby to vaporize it prior to introduction to said regulator means.

20. An apparatus according to claim 18, wherein the mixing chamber is mounted in communication with said carburetor and has a plurality of air intake ports leading into the interior of said chamber from an ambient air source, and a plurality of fuel intake ports leading into the interior of said chamber from a fuel source; the ratio of the cross-sectional areas of the fuel and air intake ports proportioned relatively to effect a predetermined equivalence ratio to provide the volume requirements of said carburetor, and said intake ports structured to deliver turbulent air and fuel into said chamber at a rate determined by the pressure within said chamber for blending a combustion mixture for delivery into said manifold at a rate determined by the pressure within said manifold.

21. A dual fuel system according to claim 18, wherein the mixing chamber for blending a combustion mixture is mounted within a conventional air filter of an internal combustion engine in communication with said carburetor.

22. A dual fuel system according to claim 18, wherein said fuel is propane and the equivalence ratio is selected from within a range of about 15 to about 17.

23. A dual fuel system according to claim 18, wherein said fuel is hydrogen gas and the equivalence ratio is selected from within a range of about 8 to about 9.

24. A dual fuel system according to claim 18, wherein the means for varying the pressure within the carburetor comprises an engine manifold creating a vacuum in registration with the carburetor and mixing chamber.

25. A dual fuel system according to claim 18, wherein regulator means maintain the pressure of the fuel entering the mixing chamber at approximately the same pressure as that of the intake air entering the mixing chamber.

26. A dual fuel system according to claim 18, wherein fuel line temperature regulator means maintain the temperature of the fuel entering the mixer at approximtely the same temperature as that of the intake air entering the mixing chamber.

27. A method for introducing fuel and air into the intake manifold of an internal combustion engine, comprising: supplying air to the vicinity of air orifice means of fixed
    cross-sectional area constituting a first inlet to a mixing chamber, said mixing chamber having an outlet in communication with said intake manifold;
    supplying said fuel in gaseous state to the vicinity of fuel orifice means of fixed cross-sectional area constituting a second inlet to said mixing chamber; the cross-sectional areas of said first and second inlets, respectively, being established to effect a selected area equivalence ratio; and
    establishing a pressure beneath said chamber effective to draw air and fuel into and through said mixing chamber into said manifold; said first and second inlets being arranged to effect rapid mixing of said air and fuel within said mixing chamber.

28. A method according to claim 27, wherein said air and fuel are supplied at approximately the same temperature and pressure.

29. A method according to claim 28, wherein said air and fuel are supplied at approximately ambient conditions.

30. A method according to claim 27, wherein said air and fuel are transferred from said mixing chamber, through a carburetor and then into said manifold.

31. A method according to claim 27, wherein said fuel orifice means comprises a plurality of intake ports.

32. A method according to claim 31, wherein said air orifice means comprises a plurality of air intake ports.

* * * * *